United States Patent
Polivka

(10) Patent No.: US 9,551,113 B1
(45) Date of Patent: Jan. 24, 2017

(54) METHOD AND APPARATUS FOR CONSTRUCTING A PARKING LOT

(71) Applicant: Polivka Parking Solutions, LLC, Weddington, NC (US)

(72) Inventor: Andrew Basil Polivka, Waxhaw, NC (US)

(73) Assignee: Polivka Parking Solutions, LLC, Weddington, NC (US)

( * ) Notice: Subject to any disclaimer, the term of this patent is extended or adjusted under 35 U.S.C. 154(b) by 0 days.

(21) Appl. No.: 15/008,808

(22) Filed: Jan. 28, 2016

(51) Int. Cl.
*E01C 3/00* (2006.01)
*E01C 9/00* (2006.01)
*E01C 5/00* (2006.01)
*E01C 5/20* (2006.01)

(52) U.S. Cl.
CPC . *E01C 9/00* (2013.01); *E01C 3/00* (2013.01); *E01C 5/003* (2013.01); *E01C 5/20* (2013.01); *E01F 9/518* (2016.02)

(58) Field of Classification Search
CPC .............. E01C 3/00; E01C 5/003; E01C 5/20; E01C 9/00; E01F 9/518
USPC ........................ 404/17–19, 27, 28, 31, 73, 75
See application file for complete search history.

(56) References Cited

U.S. PATENT DOCUMENTS

| | | | | |
|---|---|---|---|---|
| 5,833,401 A * | 11/1998 | Olson | ................. | B09B 1/00 24/443 |
| 6,053,662 A * | 4/2000 | Scuero | ................. | E02B 7/02 405/107 |
| 6,361,245 B1 * | 3/2002 | Polivka | ................. | E01C 9/086 404/32 |
| 6,481,934 B1 * | 11/2002 | Alexiew | ................. | C09K 17/00 405/258.1 |
| 6,505,996 B1 * | 1/2003 | Ianniello | ................. | E01F 5/00 404/2 |
| 6,518,208 B2 * | 2/2003 | Terakawa | ................. | D01D 5/12 264/103 |
| 6,666,617 B1 * | 12/2003 | Polivka, Jr. | ................. | E04H 6/10 404/36 |
| 7,207,743 B2 * | 4/2007 | Polivka, Jr. | ................. | E04H 6/10 404/73 |
| 7,677,833 B2 * | 3/2010 | Prevost | ................. | B64F 1/36 244/114 R |
| 8,361,261 B2 * | 1/2013 | Van Fossen | ........ | B29C 65/5028 156/182 |
| 2008/0152871 A1 * | 6/2008 | Greer | ................. | E01F 9/512 428/195.1 |
| 2010/0221972 A1 * | 9/2010 | Soane | ................. | D06M 23/08 442/327 |
| 2016/0153163 A1 * | 6/2016 | Weinstein | ............. | E02D 31/002 405/52 |

* cited by examiner

*Primary Examiner* — Raymond W Addie
(74) *Attorney, Agent, or Firm* — Tarolli, Sundheim, Covell & Tummino LLP

(57) ABSTRACT

A land area can be improved to support a geotextile having nonwoven top and bottom layers, and a geogrid core. The top layer defining at least one parking space, such that land areas of various sizes can be covered to form parking lots with rain-draining features.

15 Claims, 5 Drawing Sheets

METHOD AND APPARATUS FOR CONSTRUCTING A PARKING LOT

TECHNICAL FIELD

This disclosure relates to an apparatus and method for constructing a parking lot and, more particularly, to a method and apparatus for constructing a vehicle parking lot on a land area having a ground surface.

BACKGROUND

The transportation industry often requires additional parking areas for temporary vehicle storage prior to vehicle transfer and/or distribution. Such parking areas are typically needed adjacent rail yards and automotive production facilities. These additional parking areas are frequently only needed for a relatively short period of time, such as two or three months. Additional parking areas could instead be intended for semi-permanent (multi-year, though not indefinite-term) use, for reasons including utilizing the property pending sale or further development, or providing parking for a long-term but fixed-end-date project. Hence, it is often desirable to minimize the time and expenses associated with constructing additional parking areas, whether for multi-month or multi-year use.

Traditionally parking lots are constructed by covering a land area with concrete or asphalt. These traditional construction methods provide a desirable hard surface for vehicles to be driven on, but are time-consuming and expensive to provide. Further, covering the land area with concrete or asphalt can create complications in the project, such as having to construct a retention pond to deal with excess rain water, since the surface is not permeable. Finally, even a semi-permanent parking lot is expensive and difficult to remove when made of concrete or asphalt, and removal may leave the underlying ground surface undesirably altered.

Other, less permanent methods for constructing parking lots are also known. These other methods include covering a land area with gravel, wood chips, or shredded rubber from recycled tires. These non-traditional methods reduce the time and expenses associated with constructing the parking areas. However, these methods do not provide the desired parking surface, and can lead to the vehicles being damaged. Such vehicle damage can range from scratches in a vehicle's paint to extensive body damage caused by vehicles sliding into one another when excessive rain washes away the gravel, wood chips, or shredded rubber, and turns at least a portion of the parking area into a mud pit.

SUMMARY

In an aspect, a method of constructing a vehicle parking lot on a land area having a ground surface is disclosed. An aggregate layer is provided directly atop the existing ground surface of the land area. A sand layer is provided directly atop the aggregate layer. A composite drainage material through which water drains is provided. The composite drainage material comprises a nonwoven polyester top layer, a geogrid core, and a nonwoven polypropylene bottom layer. The land area is covered with the composite drainage material by placing rolls of the composite drainage material adjacent one another atop the sand layer. The rolls of the composite drainage material are unrolled so that longitudinal edges of adjacent rolls adjoin one another. At least a portion of the longitudinal edges of the adjacent rolls are overlapped to create a gapless and continuous surface of the composite drainage material so that the land area is underneath the composite drainage material, the bottom layer directly contacts the sand layer, and the top layer faces away from the sand layer and provides a surface on which automotive vehicles are parked. The composite drainage material directs water which contacts the top layer through the top layer, the geogrid core, and the bottom layer and into the sand layer for drainage through the sand layer and the aggregate layer into the land area covered by the composite drainage material.

In an aspect, an apparatus for constructing a vehicle parking lot on a land area having a ground surface is described. A composite drainage material through which water drains is provided. The composite drainage material comprises a nonwoven polyester top layer, a geogrid core, and a nonwoven polypropylene bottom layer. An aggregate layer is configured for placement directly atop the existing ground surface of the land area. A sand layer is configured for placement directly atop the aggregate layer. The composite drainage material is configured to cover the land area, when the aggregate and sand layers are in place atop the ground surface, so that the land area is underneath the composite drainage material and the composite drainage material is directly atop the sand layer, the bottom layer contacting the sand layer, and the top layer facing away from the land area and comprising a surface on which vehicles are parked. The composite drainage material directs water which contacts the top layer through the top layer, the geogrid core, and the bottom layer and into the sand layer for drainage through the sand layer and the aggregate layer into the land area covered by the composite drainage material. The composite drainage material is formed in rolls which are unrolled adjacent one another to cover the land. Each of the rolls has longitudinal edges. At least a portion of the adjacent longitudinal edges of the rolls overlap to form a continuous and gapless surface of the composite drainage material so that the land area is underneath the composite drainage material.

BRIEF DESCRIPTION OF THE DRAWINGS

For a better understanding, reference may be made to the accompanying drawings, in which.

DESCRIPTION OF ASPECTS OF THE DISCLOSURE

Figure 1:
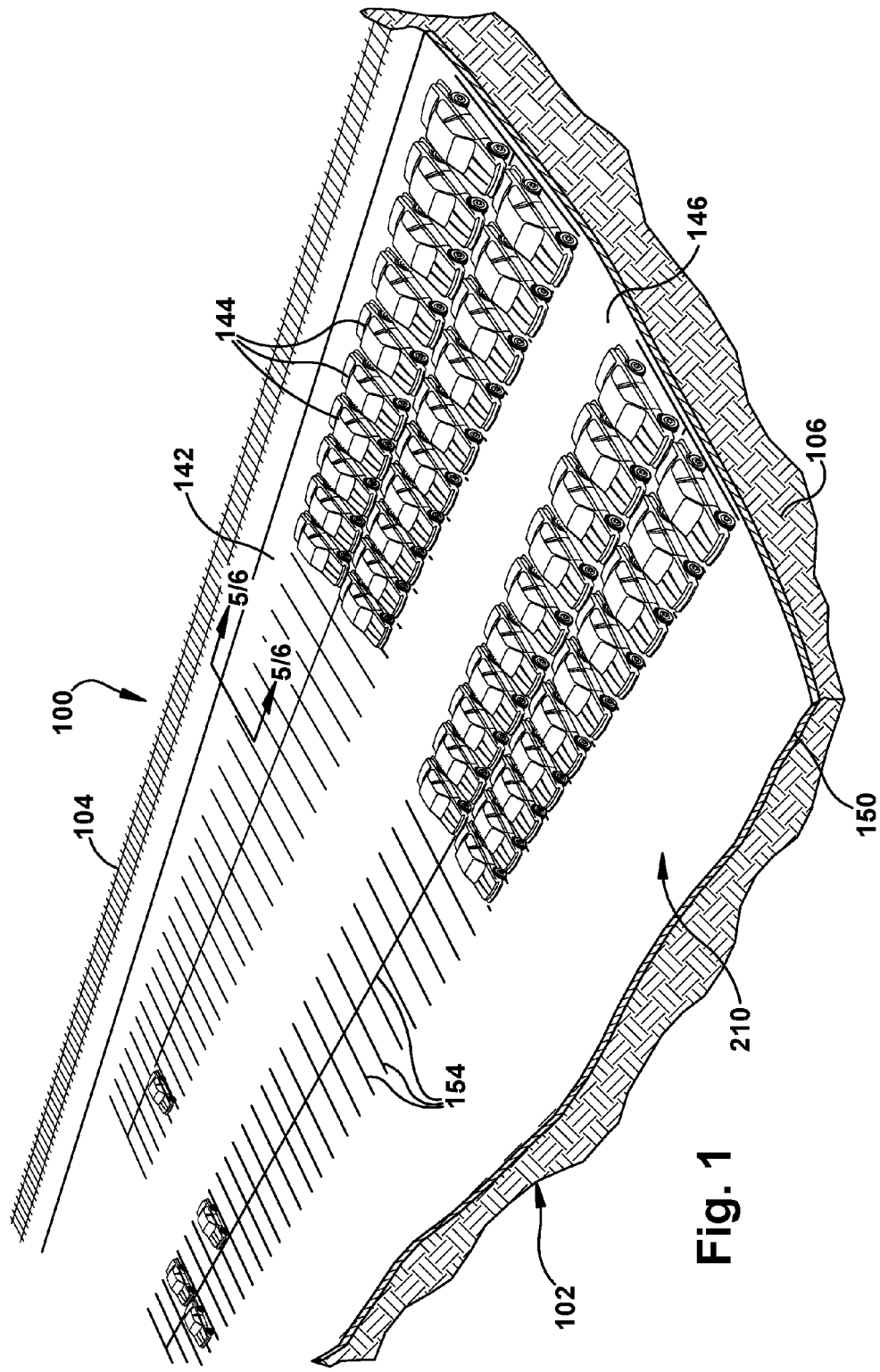
FIG. 1 is an aerial view of an example use environment of an aspect of the present invention.

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

As used herein, phrases such as "between about X and Y" can mean "between about X and about Y."

As used herein, phrases such as "from about X to Y" can mean "from about X to about Y."

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

FIG. 1 illustrates a parking lot 100, which may be temporary (intended for use for up to a few months, as the term is used herein), semi-permanent (intended for use for a few months to a few years, as the term is used herein), or permanent (with no specific intended ending date for use, as the term is used herein). The parking lot 100 may be used, for example, for storage (temporary, semi-permanent, and/or permanent) of one or more vehicles such as, but not limited to, automobiles, trucks of any size/duty-weight, trailers, military vehicles, aircraft, or any other desired conveyance. The parking lot 100 may also or instead be used for any purpose for which a non-organic ground surface may be desirable (e.g., warehousing, driving instruction, personnel assembly, or any other suitable use).

The parking lot 100 is situated on a land area 102 adjacent railroad tracks 104. The land area 102 has been cleared of any trees and large shrubbery. Thus, the land area 102 comprises soil 106 and has a ground surface 208 (FIG. 2) which may be covered by grass or other vegetation (not shown). Preferably, the land area 102 is relatively flat.

Figure 3:
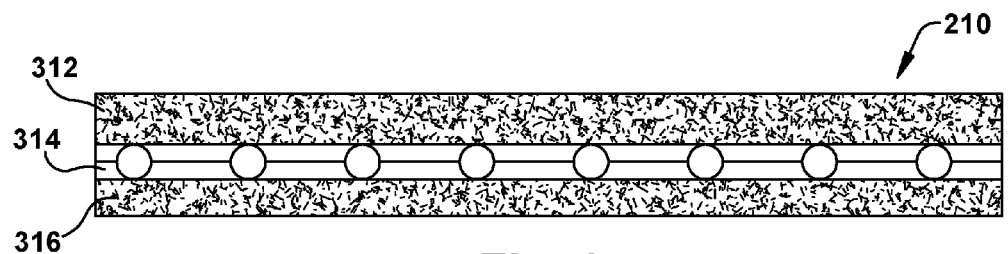
FIG. 3 is a schematic partial side cross-sectional view of a component of the aspect of FIG. 1.

A composite material 210 through which water can drain is used to construct the temporary parking lot 100 on the land area 102. As shown in FIG. 3, the composite drainage material 210 comprises a nonwoven polyester top layer 312, a geogrid core 314, and a nonwoven polypropylene bottom layer 316.

The geo-textile fabric used for the top layer 312 may be a continuous layer of a nonwoven polyester material with an additive to help protect the fabric from the effects of ultra-violet light. This nonwoven polyester material, when present, may be chosen to counteract the tendency of a polyethylene material to buckle and warp when used in parking lot use environments, particularly for longer than merely temporary use. The geogrid core 314 is preferably in the range of about 2-8 mm thick and is extruded from polyethylene resin. The geo-textile fabric used for the bottom layer 316 may be a continuous layer of a polypropylene material with an additive to help protect the fabric from the effects of ultra-violet light. The top and bottom layers 312 and 316 are water-permeable, but should be sufficiently dense to prevent solid matter, such as soil, from penetrating through the thickness of these layers. Each of the top and bottom layers 312 and 316 is preferably in the range of about 2-8 mm thick.

The geogrid core 314, which is also water-permeable, may be placed between the top and bottom layers 312 and 314 and laminated using a heat process. The heat process fuses the geogrid core 314 to both the top and bottom layers 312 and 314 of the fabric to create the composite drainage material 210.

Figure 2:
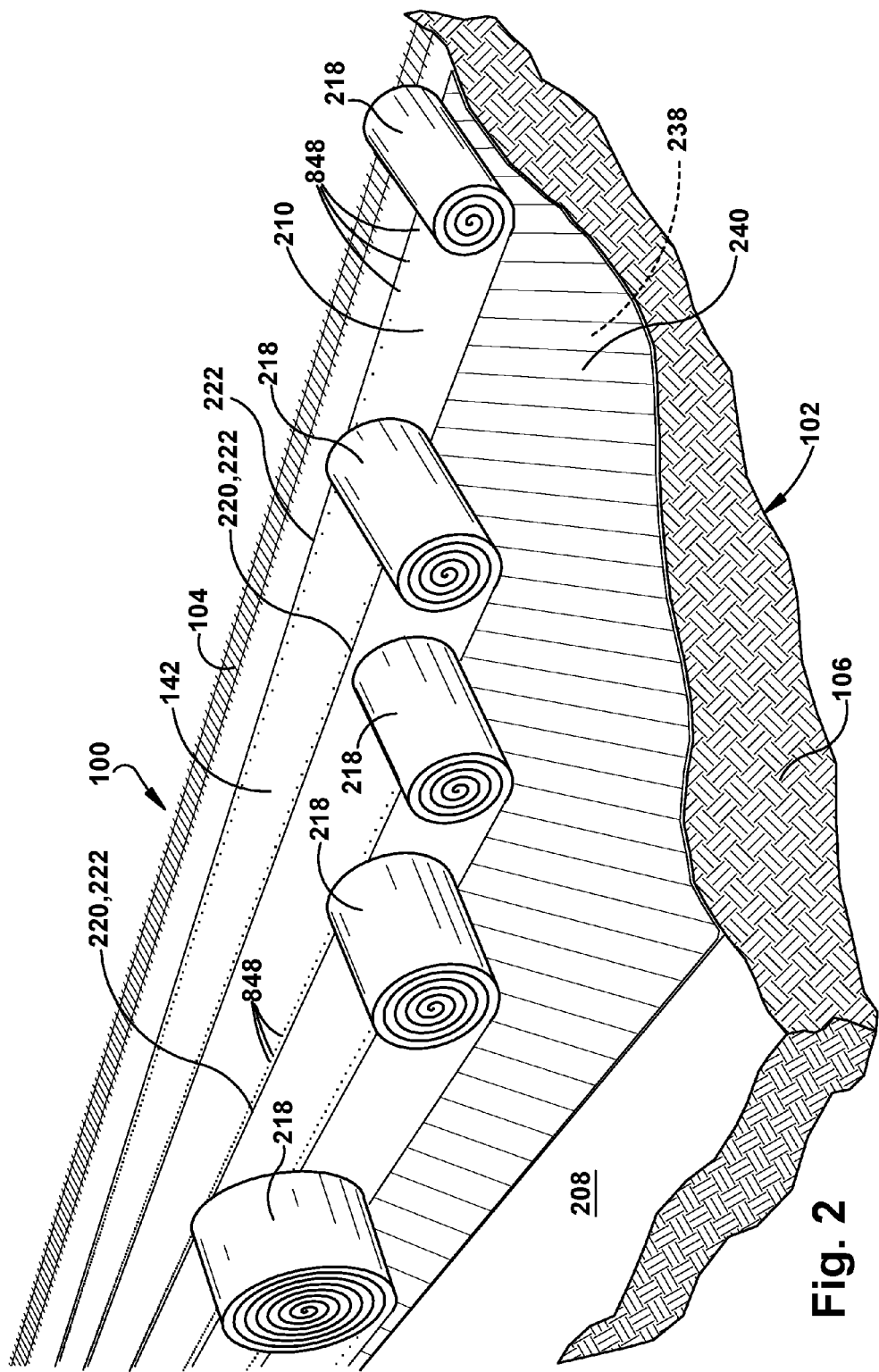
FIG. 2 is an aerial view of an example installation of the aspect of FIG. 1.
Figure 8:
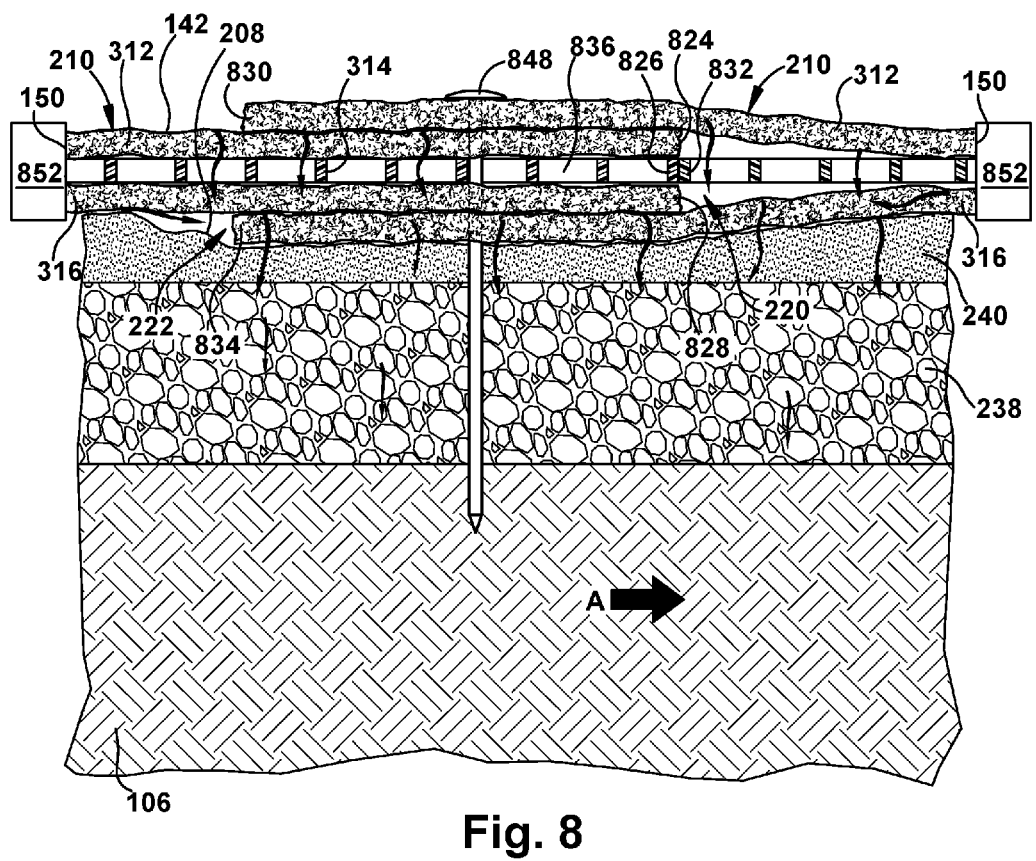
FIG. 8 is a schematic partial side cross-sectional view of the aspect of FIG. 1.

The composite drainage material 210 may be formed in rolls 218, as shown in FIG. 2, for ease of shipping and installation. The composite drainage material 210 may be in the range of about 7 to 12 feet wide, and may be, for example, up to 250 feet long when unrolled. Each roll 218 of the composite drainage material 210 has oppositely disposed first and second longitudinal edges 220 and 222, respectively. As shown in FIG. 8, the first longitudinal edge 220 is formed by an edge portion 824 of the top layer 312, an edge portion 826 of the geogrid core 314, and an edge portion 828 of the bottom layer 316. The second longitudinal edge 222 is formed by an edge portion 830 of the top layer 312, an edge portion 832 of the geogrid core 314, and an edge portion 834 of the bottom layer 316.

As shown in FIGS. 1-2, at least a portion of the first longitudinal edge 220 of one roll 218 of the composite drainage material 210 may completely overlap or underlap (e.g., creating a double-layer area that is about four inches wide on each edge of each roll 218) the second longitudinal edge 222 of a second, laterally adjacent roll 218 of the composite drainage material 210.

Figure 5:
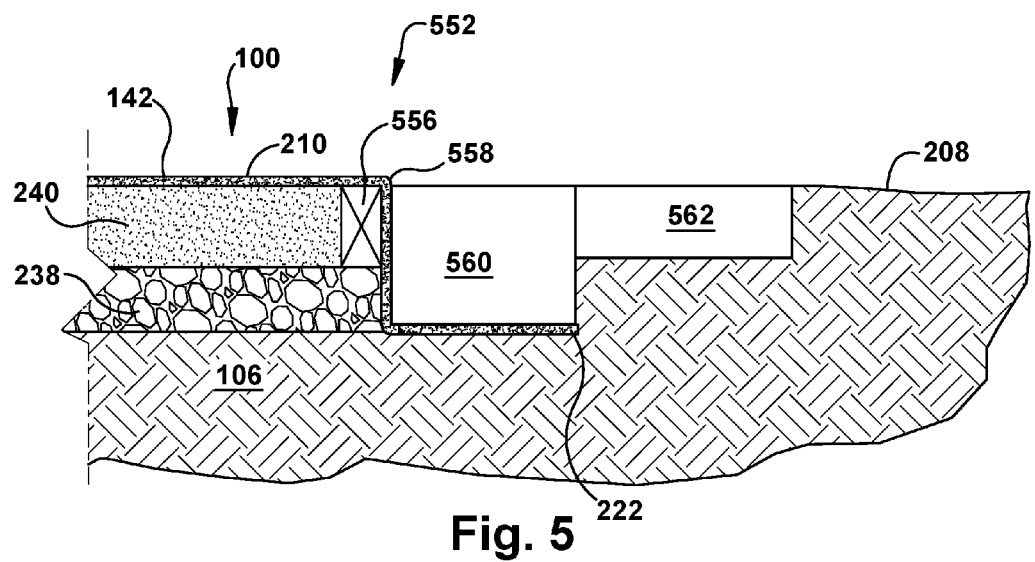
FIG. 5 is a is a schematic partial side cross-sectional view taken along line 5/6-5/6 of FIG. 1.
Figure 6:
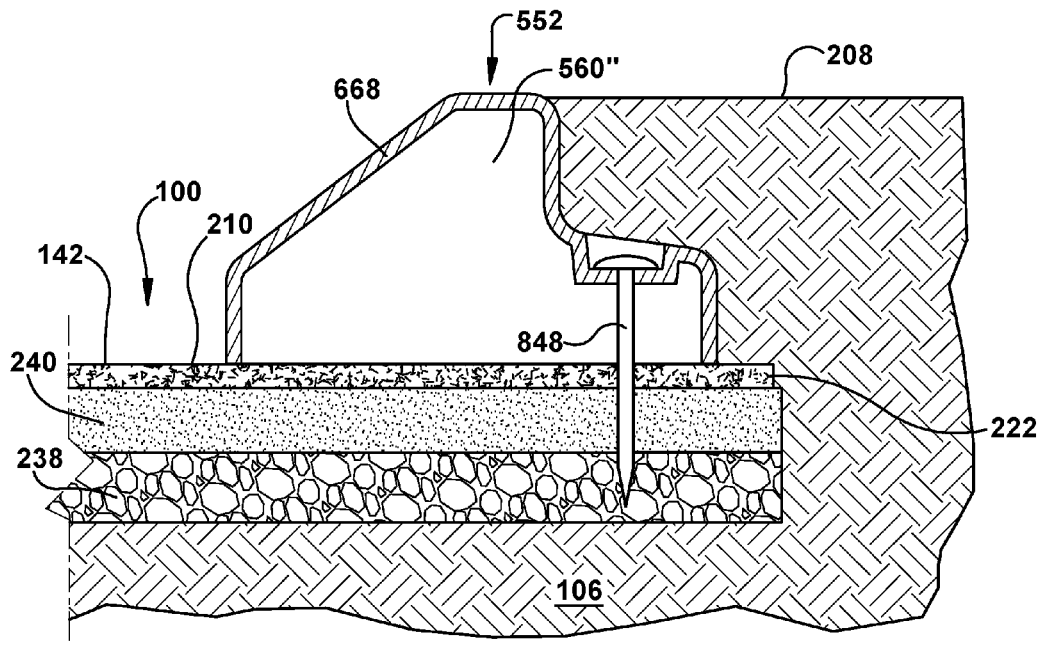
FIG. 6 is a schematic partial side cross-sectional view of the aspect taken along line 5/6-5/6 of FIG. 1.
Figure 7:
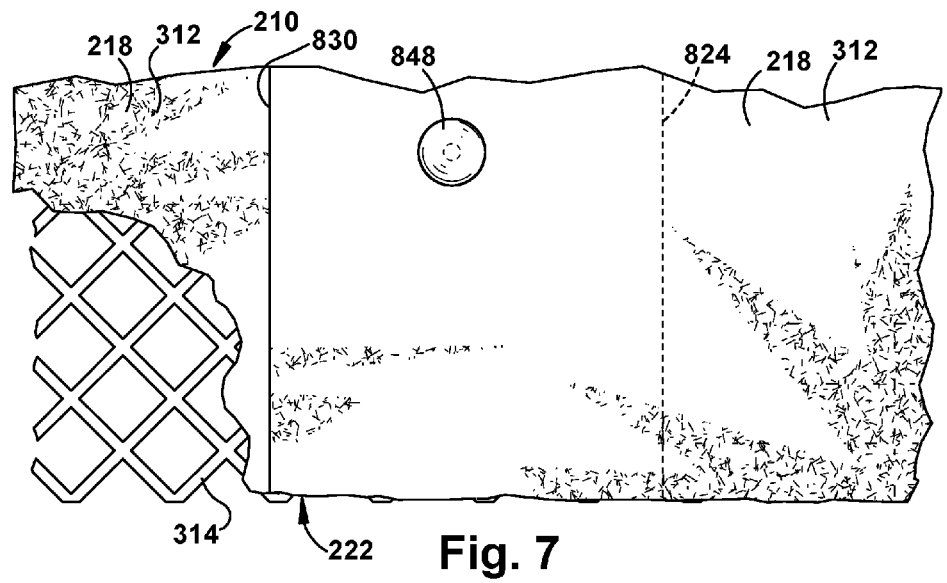
FIG. 7 is a schematic partial top view of the aspect of FIG. 1.

FIGS. 5-6, which are both cross-sectional views taken along line 5/6-5/6 in FIG. 1, illustrate two possible example configurations of edge features 552' and 552" which could be used (singly or in combination with each other and/or other edge features 552) around the outer perimeter 150 of the parking lot 100. In FIG. 5, there is a "flush" installation of the composite drainage material 210 with the surrounding ground surface 208. An elongated piece of wood (e.g., a "2×4"), metal, or any other at least semi-rigid material (shown here in cross section as stiffener 556) is placed directly underneath the composite drainage material 210 at a location spaced from the second longitudinal edge portion 222, such as by being nestled into the sand layer 240 at the outermost edge of the parking lot 100. The stiffener 556 facilitates and supports bending of the composite drainage material 210 around corner 558, and the composite drainage material 210 is then draped and tucked along the outermost edge of the aggregate and sand layers 238 and 240. A concrete, wood, metal, or other at least semi-rigid curb component 560 is then poured or otherwise placed/installed to weigh down and anchor the second longitudinal edge portion 222 of the composite drainage material 210, as shown. Optionally, a concrete, wood, metal, or other at least semi-rigid sidewalk/driveway component 562 may then be poured or otherwise placed/installed opposite the curb component 560 from the parking lot 100 surface to facilitate walking or other (including vehicle) access to the parking lot 100 from the surrounding ground surface 208.

In FIG. 6, the edge feature 552" is once again, like the edge feature 552' of FIG. 5, placed atop the composite drainage material 210 at an area spaced inward from the second longitudinal edge 222. However, in FIG. 6, the edge feature 552" is shown as including a "step-up" (non-flush) configuration such that the parking lot 100 is recessed below the ground surface 208, at least locally. A contoured curb component 560" is laid atop the composite drainage material 210, and is optionally staked into place with any desired number of stakes 848 extending through the composite drainage material 210 and into the sand and, optionally, aggregate layers 240 and 238. Soil 106 can then be backfilled, as shown, onto an anchoring shelf 664 of the curb component 560" to help maintain the curb component in place and provide a smooth transition between the parking lot 100 and the adjacent ground surface 208. Optionally, the lot-side surface 668 may be beveled, as shown, to assist in providing a desired "step-down" angle from the ground surface 208 to the parking lot 100, for any desired reason including, but not limited to, water drainage and ergonomics reasons. Though not shown in FIG. 6, a sidewalk/driveway component 562, similar to that of FIG. 5, may be provided, as desired. Regardless of whether the edge feature 552, 552', 552" is similar to, or different from, those shown in FIGS. 5-6, however, one of ordinary skill in the art can provide an edge feature 552, 552', 552" having desired anchoring (e.g., avoiding crumpling of the composite drainage material 210 under use and/or lifting up of the composite drainage material 210 by wind) properties for a particular parking lot 100 use environment.

As an alternative to a simple overlapping arrangement described above, the edge portions 826 and 832 of the geogrid cores may instead be substantially laterally end-to-end aligned with one another. As shown in FIG. 8, the edge portions 830 and 834 may be substantially longitudinally aligned with one another, while the edge portion 832 is recessed, in the direction of arrow A in FIG. 8. The edge portion 832 is recessed approximately 8-12 inches from the other edge portions 824 and 834, creating a cavity 836 in the second longitudinal edge portion 222, into which the edge portions 824, 826, and 828 are inserted such that the entire first longitudinal edge portion 220 is received within the second longitudinal edge portion 220 in an interleaved manner.

Figure 4:
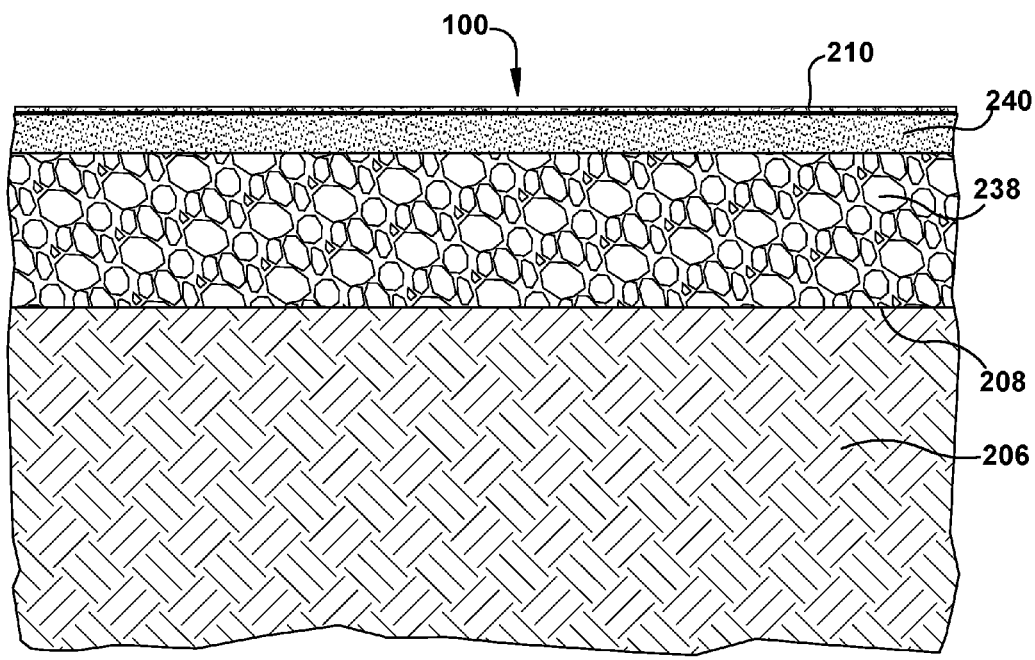
FIG. 4 is a schematic partial side cross-sectional view of the aspect of FIG. 1.

To construct the temporary parking lot 100, and with reference to especially FIGS. 2 and 4, an aggregate layer 238 may be placed directly atop the existing ground surface 208 of the land area 102, with substantially no intervening structures. For example, the aggregate layer 238 may be made of, for example, Class II crushed aggregate, and may have an average layer thickness in the range of about 4-8 inches thick, and more particularly, about 6 inches thick. A compactable sand layer 240 is then placed directly atop the aggregate layer 238, with substantially no intervening structures. For example, the sand layer 240 may have an average layer thickness in the range of about 1-3 inches thick, and more particularly, about 2 inches thick.

Once the aggregate and sand layers 238 and 240 are in place, several rolls 218 of the composite drainage material 210 are placed on the land area 102 longitudinally adjacent one another, as shown in FIG. 2. The rolls 218 of the composite drainage material 210 are then unrolled, as illustrated in FIG. 2, so that the first longitudinal edge 220 of one roll 218 of the composite drainage material 210 adjoins, optionally overlapping, the second longitudinal edge 222 of an adjacent roll 218 of the composite drainage material 210. The bottom layer 316 of each roll 218 of the composite drainage material 210 directly contacts the sand layer 240, with no intervening structures. The top layer 312 of each roll 218 faces upward, away from the land area 102, and provides a surface 142 on which vehicles 144 (FIG. 1) of any desired type may be parked.

The adjoining longitudinal edges 220 and 222 of adjacent rolls 218 are then joined together to create the continuous surface 146 of the composite drainage material 210. This joining may be via overlapping (with or without some degree of heat and/or adhesive fusion).

Alternatively, and as shown in FIG. 8, the adjoining longitudinal edges 220 and 222 of adjacent rolls 218 of the composite drainage material 210 may be joined by first inserting the first longitudinal edge 220 into the cavity 836 in the second longitudinal edge 222, as is shown in FIG. 8, to overlap at least a portion of the first and second longitudinal edges 220 and 222 in an interleaving manner. The first longitudinal edge 220 is inserted into the cavity 836 until the edge portion 826 of the geogrid core 314 in that roll 218 abuts the edge portion 832 of the geogrid core 314 of the adjacent roll 218.

Whether or not the layers of the adjacent rolls 218 of the composite drainage material are interleaved, a plurality of stakes 848 (FIG. 8) may be driven through the junction of the longitudinal edges 220 and 222 of the composite drainage material 210 and into the soil 106 of the land area 102. As may be seen in FIG. 2, the stakes 848, when present, may be spaced apart along the longitudinal edges 220 and 222 of adjoining rolls 218 of the composite drainage material 210.

This overlapping and/or staking-together of the longitudinal edges 220 and 222 of adjacent rolls 218 assists in creating a gapless and continuous surface 142 of the composite drainage material 210 so that the land area 102 is underneath the composite drainage material 210, the bottom layer 316 directly contacts the sand layer 240, and the top layer 312 faces away from the sand layer 240. In addition, the stakes 848, when present, may help to anchor the composite drainage material 210 to the ground surface 208 (with the sand and aggregate layers 240 and 238 therebetween) and, generally, to the land area 102 to restrict longitudinal movement of the composite drainage material 210 with respect to the ground surface 208.

In addition, the continuous surface 146 of the composite drainage material 210 may have a composite drainage material outer perimeter 150. The parking lot 100 may include an edge feature (shown schematically at 552 in FIG. 8, though examples of suitable edge features are shown and described in more detail in FIGS. 5-6) to resist wind lift of the composite drainage material 210. The edge feature 552 may include, but is not limited to, a curb or trench edge feature and may be continuous or intermittent around the outer perimeter 150 to substantially prevent the passage of wind under the continuous surface 146 and subsequent sail-like billowing of the composite drainage material 210 away from the ground surface 208.

Finally, to complete the parking lot 100, lines 154 (FIG. 1) are painted on the surface 146 on the top layer 312 of the composite drainage material 210, if desired, to indicate a plurality of parking places for the vehicles 144.

As shown by the sinuous downward-running arrows in FIG. 8, the composite drainage material 210 directs water, such as rain, which contacts the top surface 312 through the composite drainage material 210 and into the soil 106 of the land area 102. The water flows through the top layer 312, through the geogrid core 314, through the bottom layer 316, and into the sand layer 240 for drainage through the sand layer 240 and the aggregate layer 238 into the land area 102 covered by the composite drainage material 210. The combination of the geogrid core 314 and the top and bottom layers 312 and 316 functions to disperse the water across a large section of the land area 102 so that normal ground water flow for the land area 102 is maintained. This dispersion of the water reduces or eliminates the need for a retention pond in traditional concrete or asphalt paved parking lot arrangements.

At least the geogrid core 314 of the composite drainage material 210 provides a sufficiently hard surface for the vehicles 144 to be driven on. Further, the heat fusion of the geogrid core 314 to the top and bottom layers 312 and 316 may help facilitate the ability of the composite drainage material 210 to withstand vehicle traffic, including turning of vehicle wheels, without the fabric layers becoming detached from the core. The geo-textile fabric of the first and second layers 312 and 316 may help stabilize the soil 106 and trap the soil 106 underneath the composite drainage material 210 to prevent large amounts of dirt and/or mud from penetrating to the top layer 312 of the composite drainage material 210. Further, the continuous surface 146 formed by the overlapping joints between adjacent rolls 218 of the composite drainage material 210 also prevents dirt and/or mud from penetrating to the surface 146 between adjacent rolls 218. The composite drainage material 210 may be reusable and may have at least a two year useful life. Finally, the composite drainage material 210 may be relatively inexpensive to manufacture and install.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials; however, the chosen material(s) should be biocompatible for many applications. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A method of constructing a vehicle parking lot on a land area having a ground surface, the method comprising:
providing an aggregate layer directly atop the existing ground surface of the land area;
providing a sand layer directly atop the aggregate layer;
providing a composite drainage material through which water drains, the composite drainage material comprising a nonwoven polyester top layer, a geogrid core, and a nonwoven polypropylene bottom layer; wherein the top layer delineates at least one parking surface;
covering the land area with the composite drainage material by placing rolls of the composite drainage material adjacent one another atop the sand layer;
unrolling the rolls of the composite drainage material so that longitudinal edges of adjacent rolls adjoin one another;
overlapping at least a portion of the longitudinal edges of the adjacent rolls to create a gapless and continuous surface of the composite drainage material so that the land area is underneath the composite drainage material, the bottom layer directly contacts the sand layer, and the top layer faces away from the sand layer and provides a surface on which automotive vehicles are parked, the composite drainage material directing water which contacts the top layer through the top layer, the geogrid core, and the bottom layer and into the sand layer for drainage through the sand layer and the aggregate layer into the land area covered by the composite drainage material.

2. The method of claim 1, including anchoring the composite drainage material to the ground surface to restrict longitudinal movement of the composite drainage material with respect to the ground surface.

3. The method of claim 1, wherein the gapless and continuous surface of the composite drainage material has a composite drainage material outer perimeter, and including anchoring the composite drainage material outer perimeter to the ground surface via an edge feature to resist wind lift of the composite drainage material.

4. The method of claim 1, wherein providing an aggregate layer includes providing a six-inch layer of Class II crushed aggregate.

5. The method of claim 1, wherein providing a sand layer includes providing a two-inch layer of sand.

6. The method of claim 1, including painting lines on the top layer of the composite drainage material to indicate a plurality of parking places for vehicles.

7. The method of claim 1, wherein overlapping at least a portion of the longitudinal edges of the adjacent rolls to create a gapless and continuous surface of the composite drainage material includes staking together the longitudinal edges of adjacent rolls to create a gapless and continuous surface of the composite drainage material.

8. An apparatus for constructing a vehicle parking lot on a land area having a ground surface, the apparatus comprising:
   a composite drainage material through which water drains, the composite drainage material comprising a nonwoven polyester top layer, a geogrid core, and a nonwoven polypropylene bottom layer; wherein the top layer delineates at least one parking surface;
   an aggregate layer configured for placement directly atop the existing ground surface of the land area;
   a sand layer configured for placement directly atop the aggregate layer;
   the composite drainage material configured to cover the land area, when the aggregate and sand layers are in place atop the ground surface, so that the land area is underneath the composite drainage material and the composite drainage material is directly atop the sand layer, the bottom layer contacting the sand layer, and the top layer facing away from the land area and comprising a surface on which vehicles are parked,
   the composite drainage material directing water which contacts the top layer through the top layer, the geogrid core, and the bottom layer and into the sand layer for drainage through the sand layer and the aggregate layer into the land area covered by the composite drainage material;
   the composite drainage material being formed in rolls which are unrolled adjacent one another to cover the land, each of the rolls having longitudinal edges,
   at least a portion of the adjacent longitudinal edges of the rolls overlapping to form a continuous and gapless surface of the composite drainage material so that the land area is underneath the composite drainage material.

9. The apparatus of claim 8, wherein the composite drainage material is anchored to the ground surface to restrict longitudinal movement of the composite drainage material with respect to the ground surface.

10. The apparatus of claim 8, wherein the gapless and continuous surface of the composite drainage material has a composite drainage material outer perimeter, and wherein an edge feature is provided to anchor the composite drainage material outer perimeter to the ground surface to resist wind lift of the composite drainage material.

11. The apparatus of claim 8, wherein the aggregate layer is a six-inch layer of Class II crushed aggregate.

12. The apparatus of claim 8, wherein the sand layer is a two-inch layer of sand.

13. The apparatus of claim 8, wherein the top layer of the composite drainage material includes lines which are painted on to indicate a plurality of parking places for vehicles.

14. The apparatus of claim 8, wherein at least a portion of the adjacent longitudinal edges of the rolls overlap and are staked together at the overlapping portions by a plurality of stakes to form a continuous and gapless surface of the composite drainage material.

15. The apparatus of claim 14, wherein the plurality of stakes also secures the composite drainage material to the land area.

* * * * *